United States Patent

Youmans

[15] 3,662,173
[45] May 9, 1972

[54] WELL LOGGING METHOD FOR DETERMINING THE PRESENCE OF ALUMINUM AND MAGNESIUM

[72] Inventor: Arthur H. Youmans, Houston, Tex.
[73] Assignee: Dresser Industries, Inc., Dallas, Tex.
[22] Filed: Oct. 27, 1969
[21] Appl. No.: 869,633

[52] U.S. Cl. .................................. 250/83.3 R, 250/83.6 W
[51] Int. Cl. .......................................................... G01v 5/00
[58] Field of Search .................................... 250/83.3, 83.6 W

[56] References Cited

UNITED STATES PATENTS

| | | | |
|---|---|---|---|
| 2,905,826 | 9/1959 | Bonner et al. | 250/83.6 W |
| 2,991,364 | 7/1961 | Goodman | 250/83.6 W X |
| 3,304,424 | 2/1967 | Mills, Jr. | 250/83.3 X |
| 3,373,280 | 3/1968 | Mills, Jr. | 250/83.3 |
| 3,413,470 | 11/1968 | Allen, Jr. et al. | 250/83.3 X |

*Primary Examiner*—Archie R. Borchelt
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

An activation well logging method for determining the presence and quantity of aluminum and magnesium in formations surrounding a borehole. The formations are irradiated with 14 mev neutrons which produce aluminum and magnesium activity with half lives of 20 milliseconds and gamma ray energy of 473 kev. The neutron source is turned on for a period of time sufficient to activate aluminum and magnesium and then turned off for 20 milliseconds. During the first 4 milliseconds while the source is off, no measurement is made. During the remaining 16 milliseconds, pulses are counted which fall in the amplitude range representing gamma ray energies from 450 kev to 500 kev. The rate of occurrence of these pulses is an indication of the aluminum and magnesium content of the formation. To correct for undesired background, the rate of occurrence of pulses in the energy intervals immediately above and below the 450 to 500 kev interval is determined and subtracted from the 450 to 500 kev measurement.

10 Claims, 1 Drawing Figure

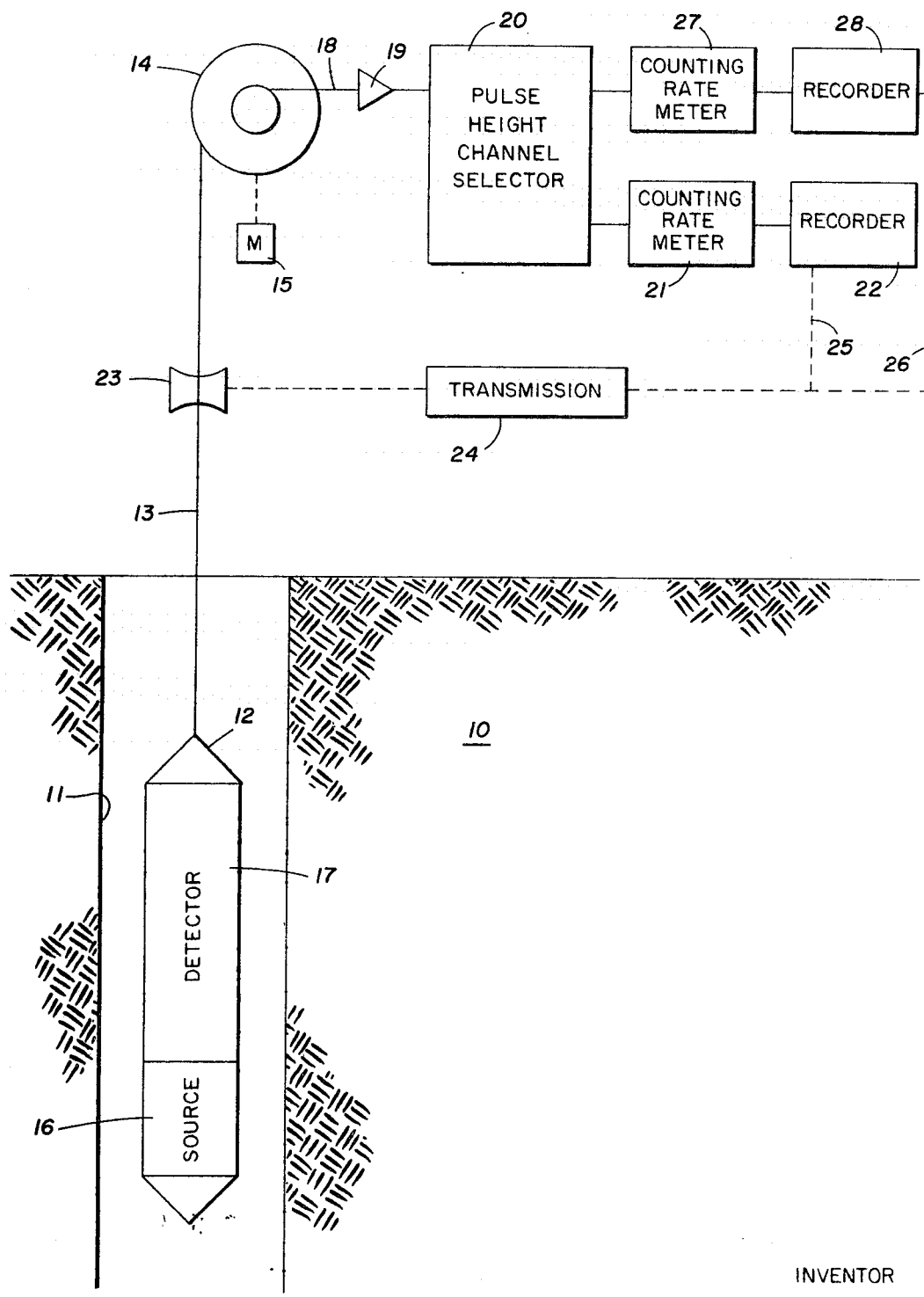

WELL LOGGING METHOD FOR DETERMINING THE PRESENCE OF ALUMINUM AND MAGNESIUM

This invention, generally, relates to geophysical prospecting, and more particularly, to an activation logging method by which the presence of aluminum and magnesium in a subsurface formation can be detected.

In attempting to produce a continuous activation well logging method for detecting aluminum and magnesium, a great deal of difficulty has been encountered in the prior art because the activity to be detected has a relatively long half life and cannot be measured without using a very intense neutron source. The activity that has been measured to detect aluminum is the 9.6 minute activity produced by the reaction $Al^{27}$ (n,p) $Mg^{27}$. For magnesium the reaction $Mg^{24}$ (n,p) $Na^{24}$ with a half life of 15 hours has been detected. Obtaining a precise measurement of these activities is difficult because of the long irradiation and measurement time involved. The longer the half life, the longer it takes to detect a given number of transmuted nuclei. In addition, the formations must be irradiated with a very intense bombardment of 14 mev neutrons to produce a detectable amount of activation in these elements. For these reasons, a method employing a short lived activity for the detection of aluminum and magnesium is highly desirable in a continuous logging process. Such an activity has not been known or utilized in the prior art.

This invention is based on the measurement of a recently discovered 20 millisecond activity which can be detected by the novel method herein disclosed. When aluminum and magnesium are irradiated with 14 mev neutrons a heretofore unknown activity is produced which has a half life of 20 milliseconds and a gamma ray energy of 473 kev. The reaction cross section of aluminum is 33 ± 10 millibarns and for magnesium is 48 ± 14 millibarns.

Prior art logging methods are unable to detect this recently discovered 20 millisecond activity of aluminum and magnesium because of its very short half life and the interference from activation of other elements. Obviously the 20 millisecond half life does not permit use of the conventional activation logging technique wherein the detector lags behind the neutron source as the instrument moves through the borehole and measures the residual activation radiation after the source has passed by. In the present case measurement must be made with the detector situated close enough to the neutron source to observe the activation without requiring movement of the instrument. This being the case, other radiation such as capture gamma rays will tend to interfere with the measurement, as will activation in the detector crystal and other instrument components.

In accordance with the present invention, a source of 14 mev neutrons is positioned in an instrument adapted to be moved through a borehole. A detector is placed in the instrument close enough to the neutron source to observe activation radiation without requiring movement of the instrument. In order to reduce interference from other reactions which may also occur, the neutron source is turned on for a period of time sufficient to activate aluminum and magnesium and then turned off for a period of time during which the activation radiation is detected. During the detection interval while the source is off, the following routine is employed. During the first part of the interval, time is allowed for undesired radiation to die away. In ordinary earth materials thermal neutrons are largely captured within 2 or 3 milliseconds. Accordingly a period of approximately 4 milliseconds should be allowed during which no measurement is made, thereby allowing the thermal neutrons and associated capture gamma rays to decay away. In some environments an interval shorter than 4 milliseconds might be acceptable. During the remaining portion of the detection interval, pulses are counted which fall in the amplitude range representing gamma ray energy of 473 kev this range might be chosen for example from 450 kev to 500 kev. The rate at which these pulses are counted is indicative of the amount of aluminum and magnesium in the formation. However, some pulses falling in this energy range will be due to activation of the detector crystal and other instrument components. In addition, there will be gamma rays produced due to activation of silicon, oxygen and other elements in the borehole and formation. These gamma rays, although generally of different energies than the magnesium and aluminum activation, will nonetheless occasionally produce pulses falling in the range of the pulse height selector. This background due to activation in the borehole and formation is minimized by continuously moving the detector in a direction away from the irradiated zone. A correction for the undesired remaining background is obtained by measuring the rate of occurrence of pulses in the energy intervals immediately above and below the 450 to 500 kev interval and subtracting a factor based on this pulse rate from the pulse rate in the desired interval representing aluminum and magnesium.

In another embodiment of the method of this invention, the following measuring technique may be employed. During the interval when the source is off, that is after the delay required for the neutrons to die away, the measurement interval is divided into two periods of equal duration and the counting rate is measured separately during each of the respective intervals. The difference between these two counting rates will indicate the magnitude of the radiation component dying away during the measurement period. Assuming no other activities of a comparably short half life, this difference measurement is proportional to the activation of aluminum and magnesium.

In a further embodiment of the method of this invention, the lifetime of neutrons in the formations surrounding the borehole is measured simultaneously with the measurement of aluminum and magnesium. Thus two logs may be obtained simultaneously, with consequent saving in time. In this embodiment the neutron source is turned on for a preselected interval such as 20 milliseconds and operates in a pulsed mode. In the pulsed mode, a neutron lifetime measurement may be made according to the system disclosed in U. S. Pat. No. 3,379,882 to A. H. Youmans. The source is then turned off for a preselected interval such as 20 milliseconds and an aluminum and magnesium measurement made according to the system previously explained.

It is therefore an object of the present invention to provide an improved activation well logging method.

It is a further object of the present invention to provide a method of detecting the presence of aluminum and magnesium in a subsurface formation.

It is still a further object of this invention to provide a method of detecting the presence and quantity of aluminum in a subsurface formation utilizing a time interval shorter than any used in detecting aluminum and magnesium in the prior art.

It is still a further object of this invention to provide an activation logging method that will compensate for interfering background radiation.

It is still a further object of this invention to provide a combined activation logging system and system for determining the lifetime of neutrons in the formation surrounding a borehole.

The above and other objects and advantages will become apparent from a consideration of the following detailed description when taken in conjunction with the accompanying drawing wherein:

The single FIGURE illustrates apparatus used in performing the method of this invention.

Referring to FIG. 1, a portion of the earth's crust 10 is shown schematically in vertical section. A well or borehole 11 penetrates the earth's crust 10 and a subsurface instrument 12 is disposed to be moved within the borehole. The instrument 12 is suspended within the borehole by a cable 13 which contains the necessary electrical conductors for connecting the electrical components of the instrument 12 with surface equipment.

The cable 13 is wound on a drum 14 positioned on the surface at the mouth of the borehole. By winding or unwinding the cable on the drum 14, the instrument can be raised or lowered in the borehole. A motor is provided to drive the drum 14 for positioning the instrument in the borehole.

The instrument 12 contains a neutron source 16 and a detector 17. The neutron source 16 produces 14 mev neutrons and may be one of a number of such sources that exist in the prior art. An example of such a source is disclosed in U. S. Pat. No. 2,689,918 to A. H. Youmans. The instrument 12 also houses a gamma ray detecting system 17 spaced close enough to the neutron source to detect the induced activation activities without requiring movement of instrument 12. The detecting system may be one of a number of such systems currently being used in the art and for the purpose of illustration may be a scintillation detector of the type illustrated in U. S. Pat. No. 3,257,557 to A. H. Youmans.

In accordance with the present invention, the instrument 12 is lowered in the borehole and the neutron source 16 irradiates the formations surrounding the borehole. Upon cessation of irradiation by the neutron source 16, the detector is activated after a 4 millisecond delay. This delay period is to allow the thermal neutrons and associated capture gamma rays to decay away. The pulses produced by the detector 17 in response to incident gamma radiation are transmitted along the cable 13 to a lead 18 at the earth's surface where the pulses are amplified by amplifier 19 and then transferred to pulse height channel selector 20.

Pulses indicative of gamma radiation in the 450 kev to 500 kev energy range are segregated from the overall spectrum of detector pulses by pulse height channel selector 20. These pulses are applied to counting rate meter 21. The output of counting rate meter 11 may be recorded by recorder 22 as an indication of the aluminum and magnesium content of the formations.

The aluminum and magnesium measurement may be correlated with depth in the borehole according to conventional means including a measuring reel 23, transmission 24 and mechanical link 25.

The pulse height channel selector also selects pulses in the ranges immediately above and immediately below the 450 kev to 500 kev energy range. These pulses are then applied to counting rate meter 27. The output of counting rate meter 27 maybe recorded by recorder 28 and correlated with depth in the borehole by measuring reel 23, transmission 24 and mechanical link 26. The output of rate meter 27 is indicative of the number of pulses due to background interference. A quantity proportional to the output of rate meter 27 may then be subtracted from the output of rate meter 21 to produce a corrected measurement of aluminum and magnesium. The proportionality constant for a given set of instrumentation may be determined by measurements in formations of known constituency. For example, in a formation that does not contain aluminum or magnesium the subtracted proportion should be adjusted so that the corrected output indicative of magnesium and aluminum is zero, and in two formations containing equal amounts of aluminum but with differing amounts of other elements such as silicon, the subtracted proportion should be such that equal results are obtained in the two cases.

The neutron source 16 and gamma ray detector 17 may be operated cyclically, for example, the neutron source may be on for 20 milliseconds and off for 20 milliseconds. During the first few milliseconds of the 20 millisecond interval that the source is off the detector is also off. This interval is chosen to allow thermal neutrons and associated capture gamma rays to decay away and may in general be about 4 milliseconds. The detector is then turned on for the remaining 16 milliseconds of the period. The detector is then turned off and the source turned on for another 20 millisecond interval, hence the instrument 12 can operate in continuous manner as it is moved through the borehole. It is to be understood that the source may equally as well be on for only a very brief interval, say 0.1 millisecond providing it emits sufficient neutrons during the interval to provide the requisite amount of activation. A neutron source output of about $10^8$ neutrons per second is satisfactory for the measurement, and the duration of the intervals of emission may be of any length up to 20 milliseconds or more per cycle. The quiescent interval, on the other hand, must be at least 3 or 4 milliseconds in order to assure that no thermal neutrons remain when the activation measurement begins. The measurement interval may be as long as desired, but no more than say 100 milliseconds because with longer intervals there will remain no appreciable activation due to magnesium and aluminum. Should there be no detectable radiation other than that due to activation of aluminum and magnesium, then the rate of occurrence of detected pulses would be observed to diminish exponentially with time, falling to half value in 20 milliseconds. If background radiation is present, a complex decay curve will be observed. By plotting the decay curve as a function of time, the exponentially decaying component may be mathematically determined by means well known in the art.

Another embodiment of the present invention contemplates a measurement of the pulses occurring in the first half of the interval, and independently a measurement of those occurring in the last half of the interval. Obviously the latter will be less than the former if any of the radiation is decaying away. Thus, by subtracting one from the other a quantity is obtained which is indicative of the short lived activation due to magnesium and aluminum. In this case it is desirable to count pulses indicative of gamma ray energies from zero to 500 kev, but not above, there being no desired radiation above 475 kev. It will be apparent that by dividing the measurement interval into two equal parts, the two parts will each have the same number of counts due to long lived background radiation. The second half will also contain a number of counts due to aluminum and magnesium activation which number will always be a fixed proportion of such counts detected during the first half. Thus by subtracting one from the other, a quantity is obtained which is free of all background radiation (within statistical accuracy) and is proportional to the total activation radiation due to aluminum and magnesium. It will be recognized that this method would be further simplified by using a neutron source of great intensity such that the requisite neutron output could be obtained in say 1 to 5 pulses per second. Assuming these pulses to be brief, say 1 millisecond each, and say 5 per second, then the measuring interval would be nearly 200 milliseconds long. Obviously in the latter half of this interval there would be practically no radiation remaining due to the 20 millisecond activity from magnesium and aluminum. Obviously then the measurement during the second half of the interval comprises a pure background measurement while the first half comprises an equal background plus the desired short lived activity.

A serious obstacle to the commercial development of the present invention is the fact that the requisite neutron source and associated instrumentation is complex, costly and generally found only in the laboratory. Accordingly, an additional embodiment of the method of this invention is provided whereby the measurement of magnesium and aluminum is attained with an instrument which simultaneously makes a log which is already in wide spread commercial use, namely the Neutron Lifetime Log. The method and apparatus for producing a Neutron Lifetime Log is disclosed in U. S. Pat. Nos. 3,379,882 and 3,379,884 issued to A. H. Youmans. As commercially used, it employs a pulsed neutron source operating at a frequency of about 1,000 cycles per second, the source being on for about 20 microseconds and off for about 1,000 microseconds each cycle. During the quiescent period between pulses the rate of decline of the neutron population is measured and a quantity is derived from the measurement which is called $\Sigma$ the neutron capture cross section of the logged formations. The present invention contemplates that the same source, detector and associated instrumentation would be retained with the modification that the measurement would be cyclically interrupted at intervals of say every 40 milliseconds, with the source completely dormant for an interval of say 20 milliseconds. It is apparent that during the 20 millisecond interval while the source is operating cyclically and the Σ measurement is being made, there is also being produced activation to the same extent as if the neutrons were being produced in a single burst or at a uniform continuous rate. Thus the desired activation of aluminum and magnesium will be produced during this interval and, upon interruption of the source, the activation may be measured in the same way as is one of the previous embodiments. It is understood that appropriate circuitry must be provided to synchronize the respective measurements with the source operating cycle.

A further modification of this embodiment provides an improvement in the Neutron Lifetime Log. The Neutron Lifetime Log under certain circumstances may make an erroneous measurement of Σ because of background radiation. This background radiation is normally eliminated in present practice by a pulse height discriminator which rejects all pulses below an amplitude indicative of an energy of 2.2 mev. If the discriminator were set at a much lower value, say 500 kev, a great number of activation gamma rays would be detected and an erroneous Σ value would be derived. But in this embodiment of the present invention, the background may be determined during the cyclic dormant interval of 20 milliseconds. Thus at the same time that the activation due to aluminum and magnesium is being measured, an independent measurement of background can be made for the purpose of correcting the Neutron Lifetime Log. This latter background measurement must of course comprise all background pulses large enough to be counted during the Neutron Lifetime Log measurement. Thus this background is measured with the same discriminator setting as is employed for the Σ measurement. If the Neutron Lifetime Log discriminator is set at 2.2 mev then the background is measured at 2.2 mev. If the Neutron Lifetime Log discriminator is set at 0.5 mev then correspondingly the background is measured at 0.5 mev. A recommended choice of gamma ray energies in this embodiment is to count all pulses from the lowest detectable energy up to 500 kev for the aluminum and magnesium measurement; and count all pulses from 500 kev up during the measurements required for both the Neutron Lifetime Log and the associated background measurement.

I claim

1. A method of determining the existence and quantity of aluminum and magnesium in subsurface earth formations comprising the steps of:

irradiating said formations with neutrons to activate any aluminum and magnesium present in the formations,
ceasing irradiation of the formation, and
measuring the gamma radiation from said formations in the energy range of about 450 kev to 500 kev as an indication of the quantity of aluminum and magnesium present in the formations.

2. The method of claim 1 wherein the measurement of gamma radiation is made during the time period beginning about 4 milliseconds after cessation of neutron irradiation and the gamma radiation measured results from the capture of fast neutrons.

3. The method of claim 2 including the steps of:
measuring the gamma radiation from said formation in the energy ranges immediately above and immediately below the 450 kev to 500 kev energy range.

4. The method of claim 3 including the steps of:
subtracting a portion of the measurement of gamma radiation in the energy ranges immediately above and immediately below the 450 kev to 500 kev energy range from the gamma radiation measurement in the energy range of about 450 kev to 500 kev.

5. The method of claim 4 wherein the time period for measurement of gamma radiation in the energy range of about 450 kev to 500 kev extends for about 16 milliseconds.

6. The method of claim 1 wherein the measurement of gamma radiation consists of a first portion and a second portion, said first portion and second portion being of equal duration.

7. The method of claim 6 including the step of obtaining the difference between said first portion of the measurement and said second portion of the measurement.

8. The method of claim 1 including the step of measuring the lifetime of neutrons in the formations.

9. The method of claim 1 including the step of measuring the neutron capture cross section of the formations.

10. The method of claim 9 including the steps of measuring radiation from the formations during a time period beginning at least 20 milliseconds after cessation of neutron irradiation as an indication of background radiation and using said measurement to correct the measurement of neutron capture cross section for errors due to background radiation.

* * * * *